(12) United States Patent
Zhang et al.

(10) Patent No.: US 12,375,552 B2
(45) Date of Patent: Jul. 29, 2025

(54) BALANCE OF LOAD

(71) Applicant: BEIJING BAIDU NETCOM SCIENCE TECHNOLOGY CO., LTD., Beijing (CN)

(72) Inventors: Fenghui Zhang, Beijing (CN); Feitong Wang, Beijing (CN); Lin Jiang, Beijing (CN); Aiyi Liang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 255 days.

(21) Appl. No.: 17/721,131

(22) Filed: Apr. 14, 2022

(65) Prior Publication Data

US 2022/0247811 A1 Aug. 4, 2022

(30) Foreign Application Priority Data

May 24, 2021 (CN) .......................... 202110567659.5

(51) Int. Cl.
*H04L 67/1008* (2022.01)
*H04L 45/42* (2022.01)
*H04L 67/1006* (2022.01)
*H04L 67/1014* (2022.01)

(52) U.S. Cl.
CPC .......... *H04L 67/1008* (2013.01); *H04L 45/42* (2013.01); *H04L 67/1006* (2013.01); *H04L 67/1014* (2013.01)

(58) Field of Classification Search
CPC ............. H04L 67/1008; H04L 67/1006; H04L 67/1014; H04L 45/42
See application file for complete search history.

(56) References Cited

U.S. PATENT DOCUMENTS

| | | | | |
|---|---|---|---|---|
| 2008/0282254 | A1* | 11/2008 | Blander | H04L 67/1001 718/105 |
| 2011/0107241 | A1* | 5/2011 | Moore | G06Q 30/02 709/224 |
| 2013/0094357 | A1* | 4/2013 | Sankar | H04L 45/586 370/230 |
| 2017/0295107 | A1* | 10/2017 | Salapura | G06F 9/5083 |

(Continued)

FOREIGN PATENT DOCUMENTS

CN 103401948 A 11/2013
CN 106330743 A 1/2017

(Continued)

*Primary Examiner* — Dhairya A Patel
(74) *Attorney, Agent, or Firm* — MASCHOFF BRENNAN; Younghwan Lee; Liang Huang

(57) ABSTRACT

A system is provided that includes: a first load balancing device cluster, the first load balancing device cluster includes a first load balancing device pool and a second load balancing device pool; at least one first switch respectively coupled with each load balancing device in the first load balancing device pool via a routing protocol link; and at least one second switch respectively coupled with each load balancing device in the second load balancing device pool via a routing protocol link, the at least one first switch and the at least one second switch are configured to be able to be connected with the Internet; and one of the first load balancing device pool and the second load balancing device pool is configured as a standby load balancing device pool of the other.

7 Claims, 7 Drawing Sheets

(56) References Cited

U.S. PATENT DOCUMENTS

| | | | | |
|---|---|---|---|---|
| 2017/0302730 | A1* | 10/2017 | Jastrzebski | H04L 47/125 |
| 2018/0198851 | A1* | 7/2018 | Barabash | H04L 67/1001 |
| 2018/0219783 | A1* | 8/2018 | Pfister | H04L 45/34 |
| 2019/0028538 | A1* | 1/2019 | Chen | H04L 65/40 |

FOREIGN PATENT DOCUMENTS

| | | |
|---|---|---|
| CN | 106488507 A | 3/2017 |
| CN | 107689925 A | 2/2018 |
| CN | 110198337 A | 9/2019 |
| CN | 112398902 A | 2/2021 |
| CN | 102449963 A | 5/2021 |
| EP | 2 436 156 B1 | 11/2016 |
| JP | 2019-533913 A | 11/2019 |
| KR | 20120019462 A | 3/2012 |

* cited by examiner

BALANCE OF LOAD

CROSS-REFERENCE TO RELATED APPLICATION

The present application claims priority to Chinese patent application No. 202110567659.5, filed on May 24, 2021, the entire contents of which are hereby incorporated by reference in their entirety for all purposes.

TECHNICAL FIELD

The present disclosure relates to the technical field of cloud computing, particularly relates to the technical field of distributed storage, and specifically relates to balance of load.

BACKGROUND

Cloud computing refers to accessing to an elastic expandable shared physical or virtual resource pool via a network. The resources may include servers, operation systems, networks, software, applications, storage devices, etc., and can be in a technical system that manages and deploys the resources as required in a self-service manner. A cloud computing technology can provide an efficient and powerful data processing capacity for technical applications (such as, artificial intelligence and block chain), and model training.

Methods described in this part are not necessarily those that have been previously conceived or adopted. Unless otherwise specified, it should not be assumed that any method described in this part is considered prior art simply because they are included in this part. Similarly, unless otherwise specified, the problems mentioned in this part should not be considered generally recognized in any prior art.

SUMMARY

According to an aspect of the present disclosure, a system is provided, including: a first load balancing device cluster, wherein the first load balancing device cluster includes a first load balancing device pool and a second load balancing device pool; at least one first switch being respectively coupled with each load balancing device in the first load balancing device pool via a routing protocol link; and at least one second switch being respectively coupled with each load balancing device in the second load balancing device pool via a routing protocol link, wherein the at least one first switch and the at least one second switch are configured to be able to be connected with the Internet, and wherein one of the first load balancing device pool and the second load balancing device pool is configured as a standby load balancing device pool of the other.

According to an aspect of the present disclosure, a method is provided, including: in response to receiving a first access request from a client, determining whether a first load balancing device pool is available according to a first Virtual IP (VIP) address corresponding to the first access request, wherein the first load balancing device pool is a main load balancing device pool corresponding to the first VIP address; and in response to determining that the first load balancing device pool is available, forwarding the first access request to at least one first switch, wherein the at least one first switch is respectively coupled with each load balancing device in the first load balancing device pool via a routing protocol link.

According to an aspect of the present disclosure, a non-transitory computer-readable storage medium is provided. The storage medium stores computer instructions that, when executed by one or more processors of an electronic apparatus, cause the electronic apparatus to perform operations including: in response to receiving a first access request from a client, determining whether a first load balancing device pool is available according to a first Virtual IP (VIP) address corresponding to the first access request, wherein the first load balancing device pool is a main load balancing device pool corresponding to the first VIP address; and in response to determining that the first load balancing device pool is available, forwarding the first access request to at least one first switch, wherein the at least one first switch is respectively coupled with each load balancing device in the first load balancing device pool via a routing protocol link.

BRIEF DESCRIPTION OF THE DRAWINGS

The drawings exemplarily show the embodiments, constitute a part of the description, and are used to explain exemplary implementations of the embodiments together with text description of the description. The illustrated embodiments are for illustrative purposes only and do not limit the scope of the claims. In all the drawings, the same reference signs refer to similar but not necessarily the same elements.

DETAILED DESCRIPTION

The exemplary examples of the present disclosure, including various details of the embodiments of the present disclosure to facilitate understanding, are illustrated below in combination with the drawings, and should be regarded as merely exemplary. Therefore, those of ordinary skill in the art should appreciate that various changes and modifications can be made to the embodiments described herein without departing from the scope of the present disclosure. Likewise, for clarity and conciseness, description of well-known functions and structures is omitted in the following description.

In the present disclosure, unless otherwise specified, the use of the terms "first", "second", etc. to describe various elements is not intended to limit the positional relationship, timing relationship, or importance relationship of these elements. Such terms are only used for distinguishing one element from another. In some examples, the first element and the second element may refer to the same instance of the element, whereas in some cases, based on the description of the context, they may also refer to different instances.

The terms used in the description of the various examples in the present disclosure are only for the purpose of describing specific examples, and are not intended to limit. Unless the context clearly indicates otherwise, if the quantity of elements is not specifically limited, there may be one or more elements. In addition, the term "and/or" used in the present disclosure covers any one of listed items and all possible combination modes.

The embodiments of the present disclosure will be described in detail below with reference to the drawings.

Figure 1:
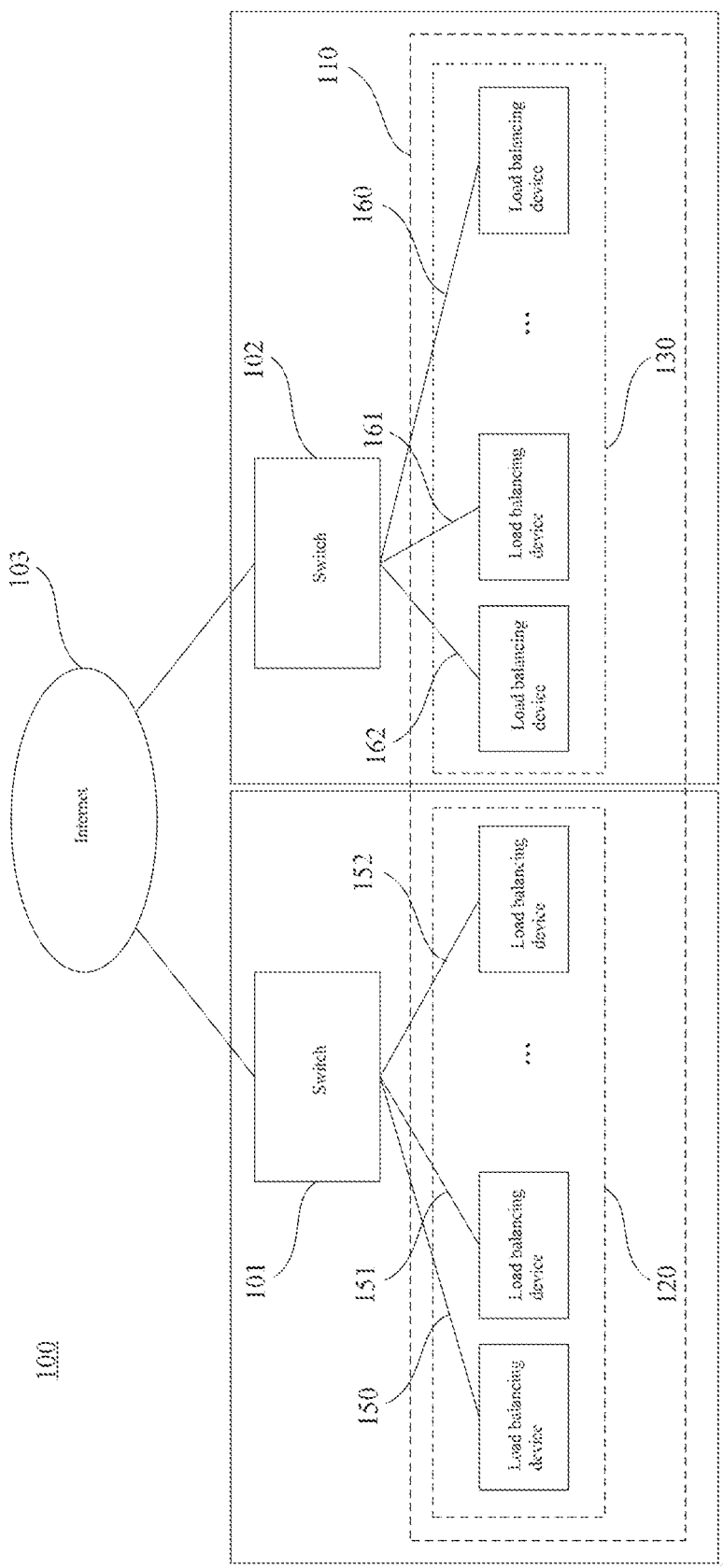
FIG. 1 shows a schematic diagram of a load balancing system according to some embodiments of the present disclosure.

FIG. 1 shows a schematic diagram of a load balancing system according to some embodiments of the present disclosure. As shown in FIG. 1, the load balancing system includes at least one first switch 101, at least one second switch 102 and a first load balancing device cluster 110.

The first load balancing device cluster 110 includes a first load balancing device pool 120 and a second load balancing device pool 130, the at least one first switch 101 is respectively coupled with each load balancing device in the first load balancing device pool 120 via routing protocol links 150, 151, and 152, and the at least one second switch 102 is respectively coupled with each load balancing device in the second load balancing device pool 130 via routing protocol links 160, 161 and 162. The at least one first switch 101 and the at least one second switch 102 are configured to be able to be connected with the Internet 103 through a router, for example. One of the first load balancing device pool 120 and the second load balancing device pool 130 is configured as a standby load balancing device pool of the other. In other words, the first load balancing device pool 120 and the second load balancing device pool 130 may be mutually main and standby. It is clear to those skilled in the art that the Internet 103 may be understood as including a backbone network and a metropolitan area network. In some embodiments, the Internet 103 of the present disclosure specifically refers to the backbone network.

The load balancing system according to the present embodiments can improve the disaster tolerant capability of the system. Specifically, when a tenant is assigned to access to the first load balancing device pool 120, the second load balancing device pool 130 is the standby load balancing device pool. If it is detected that the first load balancing device pool 120 fails or is abnormal in working state (for example, traffic or load exceeds a threshold), the first load balancing device pool 120 is switched to the second load balancing device pool 130 to continue working for the tenant. Similarly, when the tenant is assigned to access to the second load balancing device pool 130, the first load balancing device pool 120 is the standby load balancing device pool. If it is detected that the second load balancing device pool 130 fails or is abnormal in working state, the second load balancing device pool 130 is switched to the first load balancing device pool 120 to continue working for the tenant, so as to realize a disaster tolerant solution that is mutually main and standby.

In some embodiments, the at least one first switch 101 and the at least one second switch 102 may be deployed on a load balancing device cabinet, and the load balancing devices are directly connected to the switches of their cabinet, so that interconnection of the load balancing devices and the switches in the cabinet is realized.

In some embodiments, capacity and load scheduling may be performed among a plurality of load balancing device pools, that is, under the condition that the load balancing device pools do not fail or are not abnormal in working state, if the load of one load balancing device pool is too high, some of work tasks therein may be switched to the other load balancing device pools so as to relieve load pressure.

In some embodiments, before switching the load balancing device pool for the tenant, the state of the standby load balancing device pool needs to be detected, and when the state of the standby load balancing device pool cannot meet switching requirements, switching cannot be performed. Optionally, the switching requirements are related to one or more of traffic, load or temperature.

Figure 2:
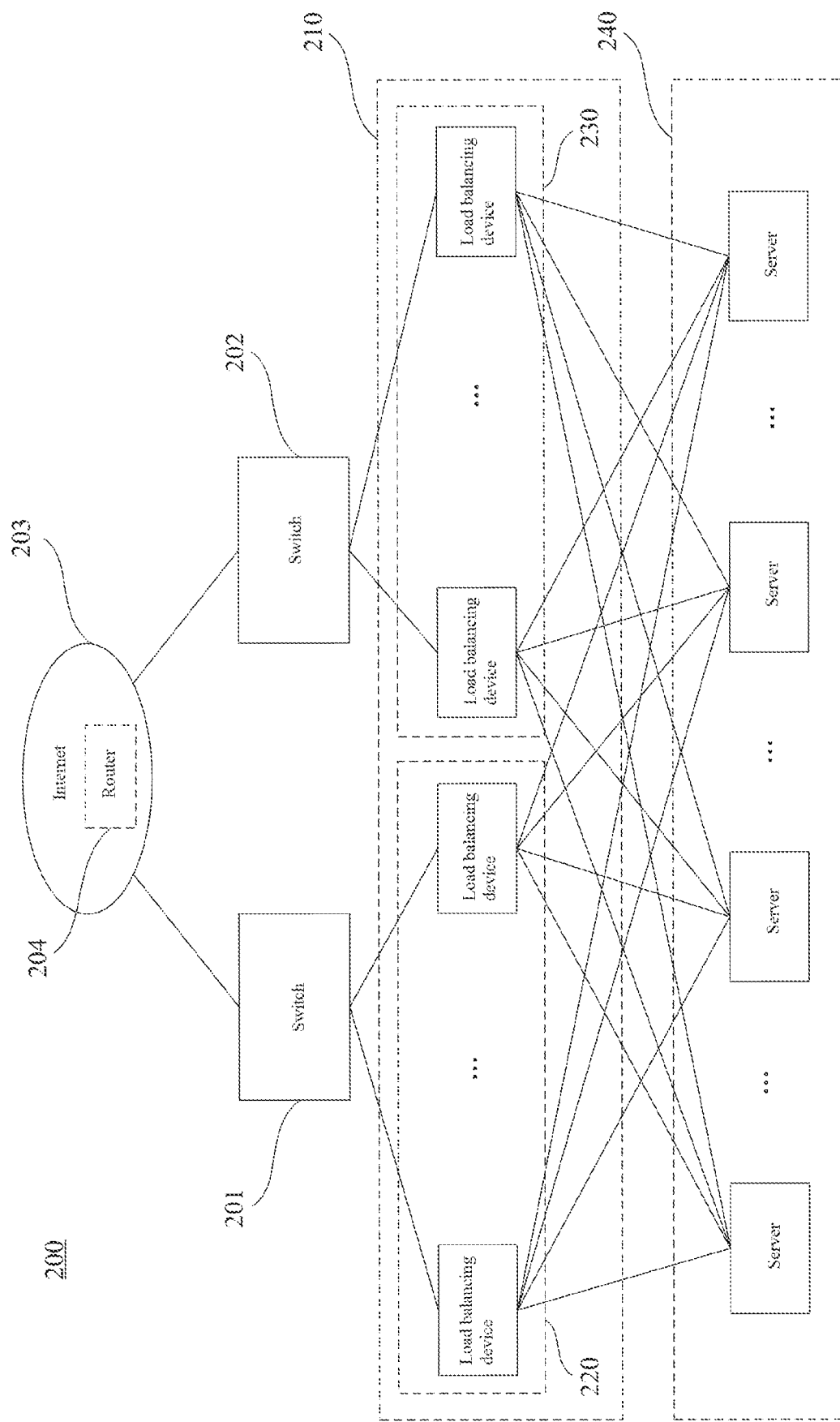
FIG. 2 shows a schematic diagram of a load balancing system according to some embodiments of the present disclosure.

FIG. 2 shows a schematic diagram of a load balancing system according to some embodiments of the present disclosure. As shown in FIG. 2, a first load balancing device cluster 210 is connected with back-end servers 240. It should be understood that a mode that the first load balancing device cluster 210 is upwardly connected with the Internet 203 through switches 201 and 202 (for example, through a router 204) is the same as that described in combination with FIG. 1, and will not be repeated here.

Each load balancing device in a first load balancing device pool 220 is respectively communicatively coupled with each of one or more back-end servers 240; and each load balancing device in a second load balancing device pool 230 is also respectively communicatively coupled with each of the one or more of back-end servers 240.

In the present embodiments, when a tenant requests access, if a main load balancing device pool (for example, the first load balancing device pool 220) does not fail, the tenant accesses to the back-end servers 240 via the main load balancing device pool. If the main load balancing device pool (for example, the first load balancing device pool 220) fails or is abnormal in working state, the tenant accesses to the back-end servers 240 via a standby load balancing device pool (for example, the second load balancing device pool 230). Different load balancing device pools 220 and 230 are connected with the same back-end servers 240, which can improve the utilization efficiency of the back-end servers.

Figure 3:
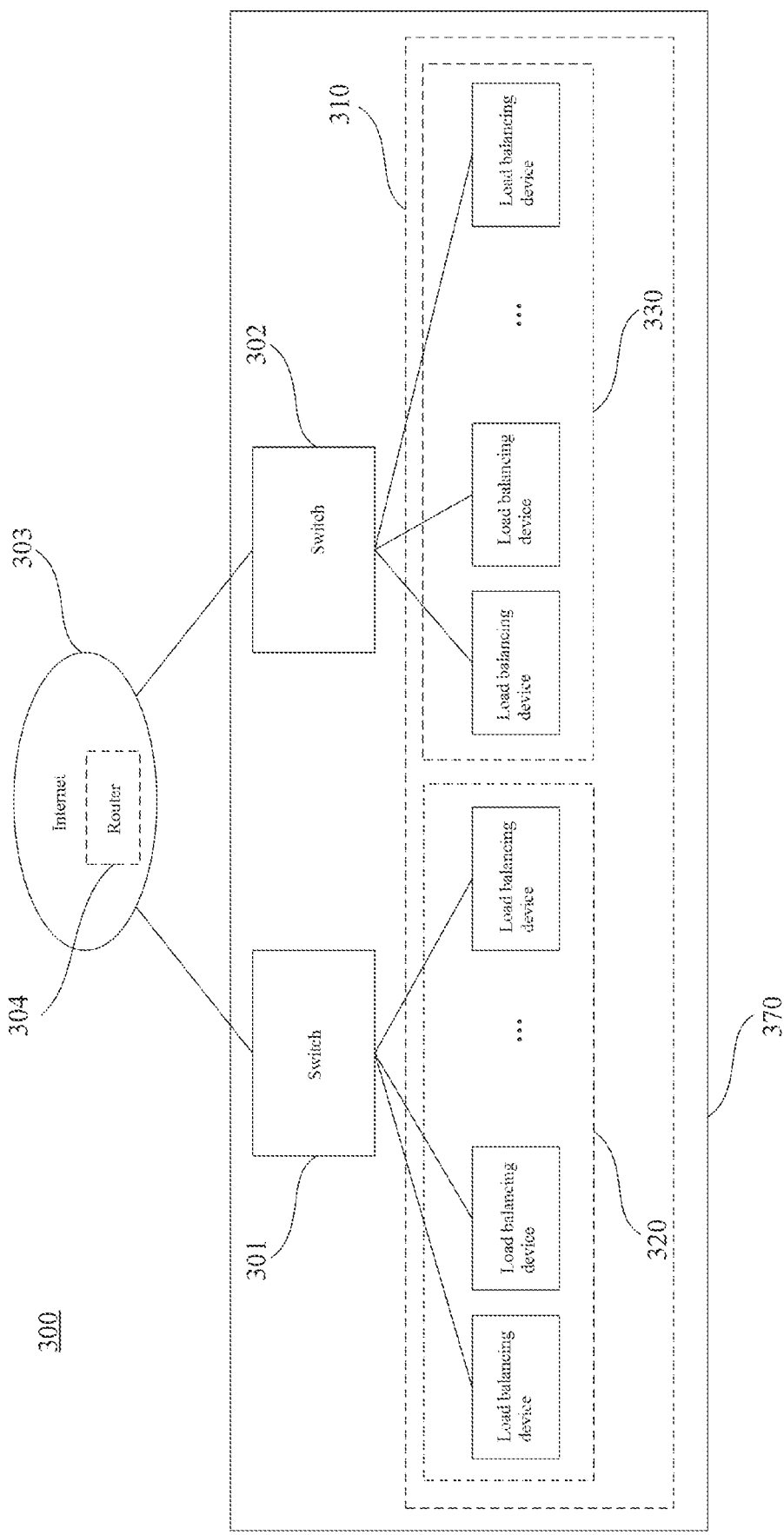
FIG. 3 shows a schematic diagram of a load balancing system according to some embodiments of the present disclosure.

FIG. 3 shows a schematic diagram of a load balancing system according to some embodiments of the present disclosure. As shown in FIG. 3, at least one first switch 301, a first load balancing device pool 320, at least one second switch 302 and a second load balancing device pool 330 are all located in a first available zone 370. In the present disclosure, the available zone refers to an area where a set of independent devices is located, such as an independent computer room. Devices in different available zones are independent of each other, that is, a device failure in one available zone does not affect the other available zone. It should be understood that a mode that a first load balancing device cluster 310 is upwardly connected with the Internet 303 through the switches 301 and 302 is the same as that described in combination with FIG. 1, and will not be repeated here.

When a main load balancing device pool (for example, the first load balancing device pool 320) fails or is abnormal in working state, the main load balancing device pool can be quickly switched to a standby load balancing device pool (for example, the second load balancing device pool 330) located in the same available zone 370, so as to achieve rapid response to disaster tolerant.

In some embodiments, a plurality of load balancing device clusters may be arranged in the same available zone, including a plurality of load balancing device pools. When a load balancing solution that divides tenants by, for example, taking the computer room as a dimensionality is adopted, the disaster tolerant and response capabilities can be improved.

According to some embodiments, the at least one first switch 301 and the first load balancing device pool 320 may be located in a first available zone, and the at least one second switch 302 and the second load balancing device pool 330 may be located in a second available zone that is different from the first available zone.

In some embodiments, different available zones may be located in the same region to achieve cross-computer-room disaster tolerant in the same region. When the main load balancing device pool fails or is abnormal in working state, the cross-computer-room disaster tolerant in the same region may be quickly switched to the standby load balancing device pool located in another available zone in the same region, so as to reduce the impact on tenant service.

In some embodiments, different available zones may be located in different regions. When the main load balancing device pool fails or is abnormal in working state, the main load balancing device pool can be switched to the standby load balancing device pool in another available zone located in a region different from the main load balancing device pool, so as to realize the cross-region disaster tolerant solution and improve the reliability of the tenant service.

Figure 4:
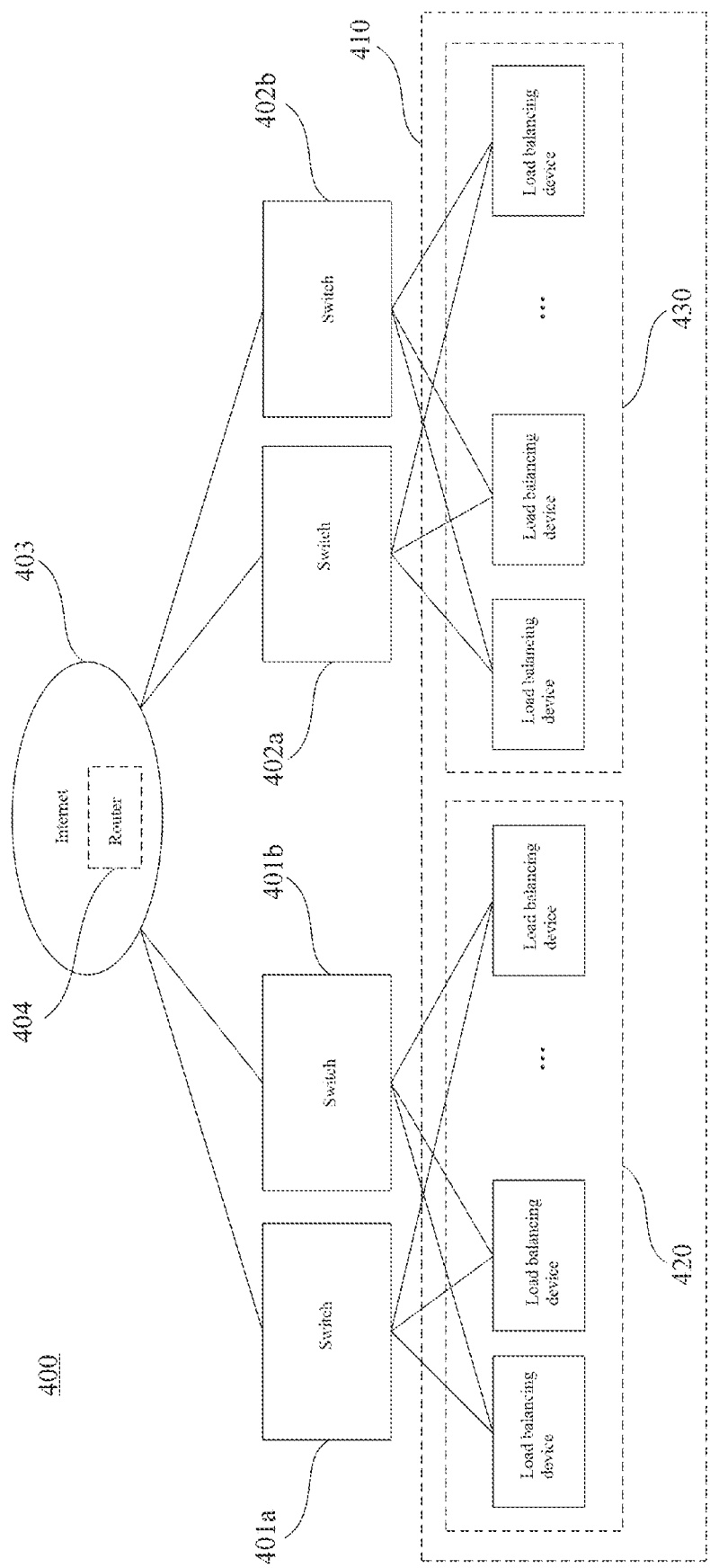
FIG. 4 shows a schematic diagram of a load balancing system according to some embodiments of the present disclosure.

FIG. 4 shows a schematic diagram of a load balancing system according to some embodiments of the present disclosure. As shown in FIG. 4, the load balancing system of the present embodiments includes a main first switch 401a and a standby first switch 401b, a main second switch 402a and a standby second switch 402b, wherein the first switches 401a-b are respectively coupled with each load balancing device in a first load balancing device pool 420 via routing protocol links, and the second switches 402a-b are respectively coupled with each load balancing device in a second load balancing device pool 430 via routing protocol links.

In the present embodiments, optionally, there is a keep-alive mechanism among the first switches 401a-b, the second switches 402a-b, and the Internet 403. When the main first switch 401a in the first switches works normally, a tenant accesses to the load balancing devices located in the first load balancing device pool 420 via the main first switch 401a in the first switches; and when the keep-alive mechanism detects that the main first switch 401a in the first switches fails or is abnormal in working state, the tenant accesses to the load balancing devices located in the first load balancing device pool 420 via the standby first switch 401b in the first switches. Similarly, when the main second switch 402a in the second switches works normally, the tenant accesses to the load balancing devices located in the second load balancing device pool 430 via the main second switch 402a in the second switches; and when the keep-alive mechanism detects that the main second switch 402a in the second switches fails or is abnormal in working state, the tenant accesses to the load balancing devices located in the second load balancing device pool 430 via the standby second switch 402b in the second switches.

In some optional implementations of the present embodiments, the main switches and the standby switches may be determined in a rotating manner.

Figure 5:
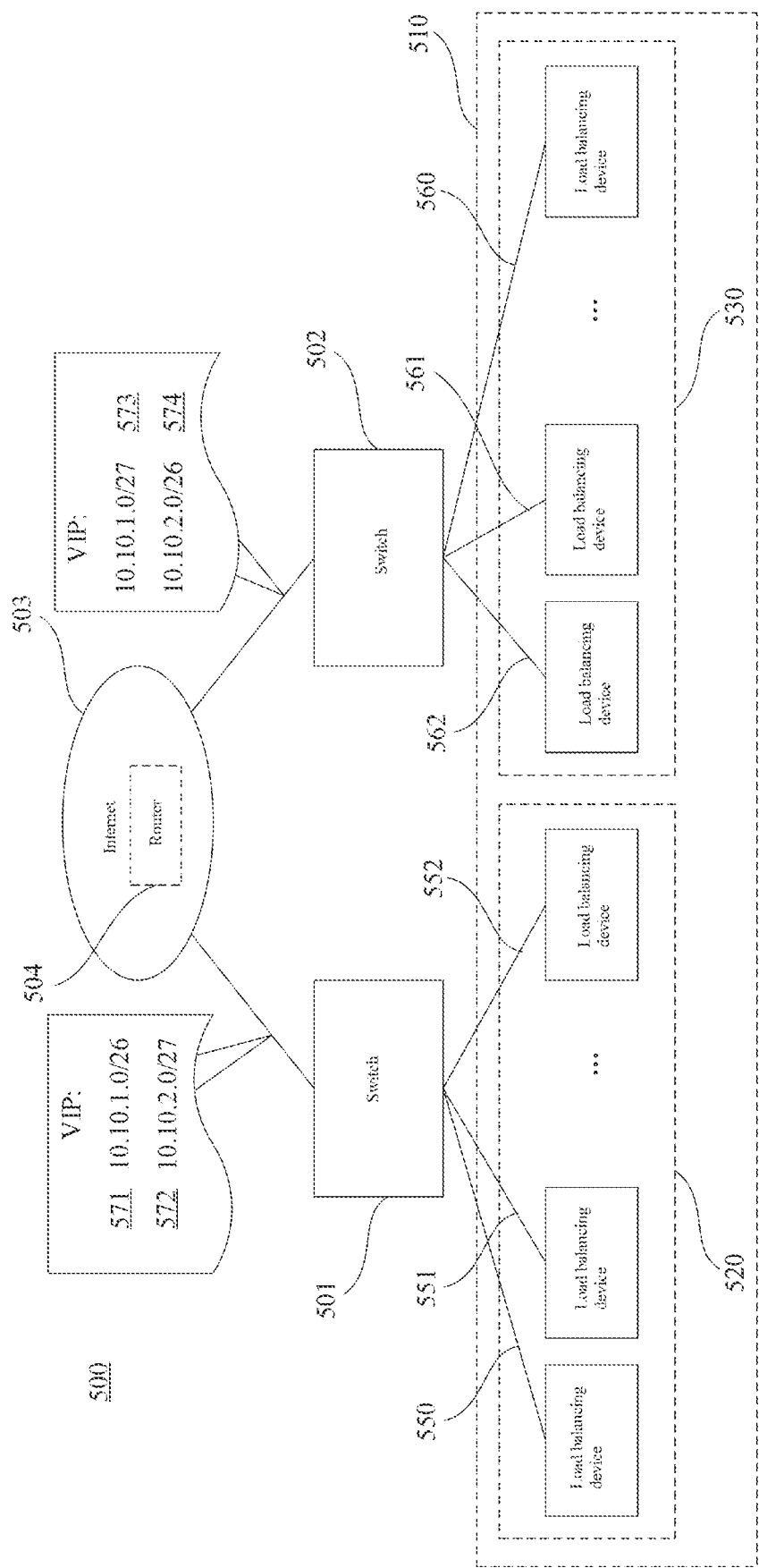
FIG. 5 shows a schematic diagram of routing information publishing according to some embodiments of the present disclosure.

FIG. 5 shows a schematic diagram of routing information publishing according to some embodiments of the present disclosure. As shown in FIG. 5, a load balancing system includes: at least one first switch 501, at least one second switch 502, and a first load balancing device cluster 510. It should be understood that a mode that the first load balancing device cluster 510 is upwardly connected with the Internet 503 through the switches 501 and 502 is the same as that described in combination with FIG. 1, and will not be repeated here.

The first load balancing device cluster 510 may include a first load balancing device pool 520 and a second load balancing device pool 530. The at least one first switch 501 is respectively coupled with each first load balancing device in the first load balancing device pool 520 via routing protocol links 550, 551 and 552, and the at least one second switch 502 is respectively coupled with each load balancing device in the second load balancing device pool 530 via routing protocol links 560, 561 and 562.

According to the present embodiments, each load balancing device in the first load balancing device pool 520 is configured to upwardly publish first routing information, that is, each load balancing device publishes its own routing information to the Internet 503 via the switch; and each load balancing device in the second load balancing device pool 530 is configured to upwardly publish second routing information. The second routing information is different from the first routing information.

According to the present embodiments, the first routing information may include first VIP information 571 corresponding to the first load balancing device pool 520 as a main load balancing device pool, and second VIP information 572 corresponding to the first load balancing device pool 520 as a standby load balancing device pool of the second load balancing device pool 530.

In the present embodiments, the second routing information may include third VIP information 573 corresponding to the second load balancing device pool 530 as a main load balancing device pool, and fourth VIP information 574 corresponding to the second load balancing device pool 530 as a standby load balancing device pool of the first load balancing device pool 520.

The first VIP information 571 corresponds to the fourth VIP information 574, and the second VIP information 572 corresponds to the third VIP information 573. When the first load balancing device pool 520 serves as the main load balancing device pool, a tenant first accesses to the first VIP information 571. Further, when the first load balancing device pool 520 fails or is abnormal in working state, the tenant is switched to access to the fourth VIP information 574 corresponding to the first VIP information 571, and the second load balancing device pool 530 is used. Similarly, when the second load balancing device pool 530 serves as the main load balancing device pool, the tenant first accesses to the third VIP information 573. Further, when the second load balancing device pool 530 fails or is abnormal in working state, the tenant is switched to access to the second VIP information 572 corresponding to the third VIP information 573, and the first load balancing device pool 520 is used.

According to some embodiments, a Prefix value that may be included in the first VIP information 571 is 25, a Prefix value that may be included in the fourth VIP information 574 is 24, and the first VIP information 571 and the fourth VIP information 574 may include the same first VIP address.

According to some embodiments, a Prefix value that may be included in the second VIP information 572 is 24, a Prefix value that may be included in the third VIP information 573 is 25, and the second VIP information 572 and the third VIP information 573 may include the same second VIP address. The second VIP address is different from the first VIP address.

According to some embodiments, the routing protocol links 550-552, and 560-562 may use a Border Gateway Protocol (BGP) or an Open Shortest Path First (OSPF) protocol.

Figure 6:
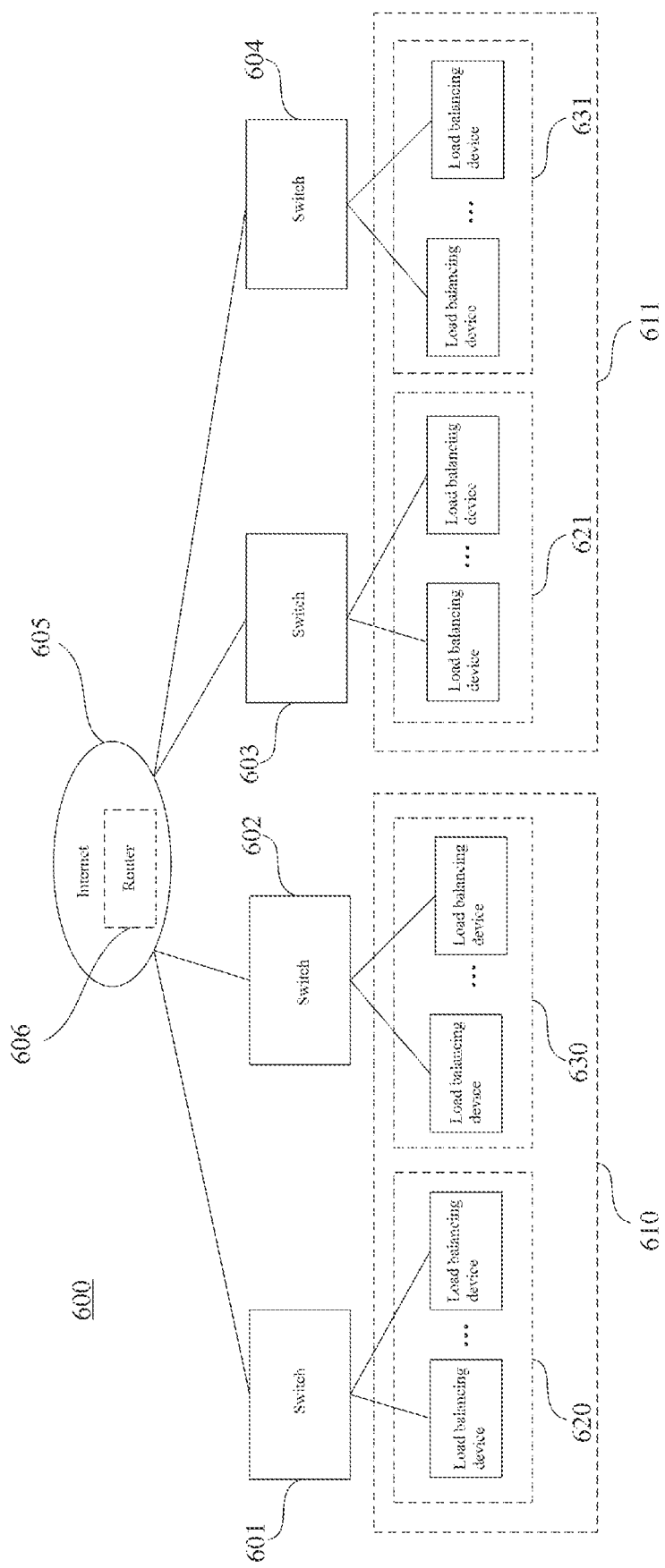
FIG. 6 shows a schematic diagram of a load balancing system according to some embodiments of the present disclosure.

FIG. 6 shows a schematic diagram of a load balancing system according to some embodiments of the present disclosure. As shown in FIG. 6, the load balancing system further includes: at least one second load balancing device cluster 611, which includes a third load balancing device pool 621 and a fourth load balancing device pool 631; at least one third switch 603 being respectively coupled with each load balancing device in the third load balancing device pool 621 via routing protocol links; and at least one fourth switch 604 being respectively coupled with each load balancing device in the fourth load balancing device pool 631 via routing protocol links. Furthermore, one of the third load balancing device pool 621 and the fourth load balancing device pool 631 is configured as a standby load balancing device pool of the other.

The at least one third switch 603 and the at least one fourth switch 604 are configured to be able to be connected with the Internet 605, and a tenant may access to the load balancing system through the Internet 605. It should be understood that a mode that the first load balancing device cluster 610 is upwardly connected with the Internet 605 through the switches 601 and 602 is the same as that described in combination with FIG. 1, and will not be repeated here.

In the present embodiments, the third load balancing device pool 621 and the fourth load balancing device pool 631 form a disaster tolerant system that is mutually main and standby, and the disaster tolerant capability is improved. Specifically, when the tenant is assigned to access to the third load balancing device pool 621, the fourth load balancing device pool 631 is a standby load balancing device pool. If it is detected that the third load balancing device pool 621 fails or is abnormal in working state, the third load balancing device pool 621 is switched to the fourth load balancing device pool 631 for the tenant. Similarly, when the tenant is assigned to access to the fourth load balancing device pool 631, the third load balancing device pool 621 is a standby load balancing device pool. If it is detected that the fourth load balancing device pool 631 fails or is abnormal in working state, the fourth load balancing device pool 631 is switched to the third load balancing device pool 621 for the tenant.

According to some embodiments, the load balancing system may continue to horizontally expand a plurality of load balancing device clusters, which can make system expansion more convenient. In response to the needs of large-capacity tenants, when a single load balancing device cluster cannot bear the pressure, a load balancing system including a plurality of load balancing device clusters may be used to share the pressure.

In some embodiments, the tenants can arrange work tasks across the load balancing device clusters, that is, one part of the work tasks of the tenants may be arranged on a first load balancing device cluster 610, and the other part may be arranged on a second load balancing device cluster 611, so as to make full use of load balancing device resources.

In some embodiments, the load balancing device clusters may be divided into various cluster types (for example, exclusive load balancing device clusters, shared load balancing device clusters, and test load balancing device clusters) according to tenant requirements. When the tenants request to access to or create a load balancing service, the tenants with specific needs or meeting specific conditions are preferentially assigned to a specific type of cluster; and other tenants are assigned to corresponding clusters according to a background load balancing control program.

In some embodiments, the background load balancing control program may be selected according to the quantity of tenants in a current cluster.

In some embodiments, clusters assigned to specific tenants are not allowed to be used by other tenants.

Figure 7:
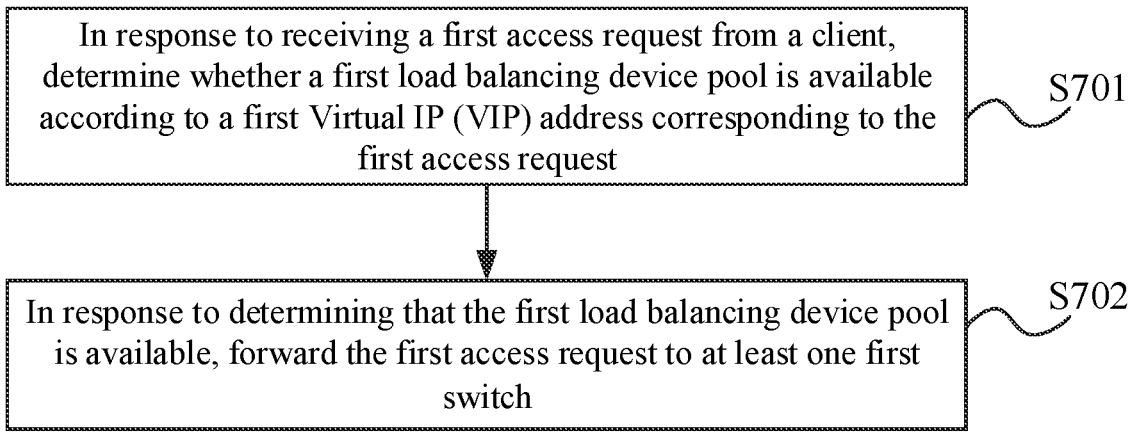
FIG. 7 shows a flow diagram of a load balancing method according to some embodiments of the present disclosure.

Continuing to refer to FIG. 7, FIG. 7 shows a flow diagram of a load balancing method according to some embodiments of the present disclosure. The load balancing method of the present disclosure may be executed by, for example, one or more routers, and the one or more routers may be considered to constitute a part of the Internet. As shown in FIG. 7, the method of the present embodiments includes the following steps:

Step S701, in response to receiving a first access request from a client, determining whether a first load balancing device pool is available according to a first Virtual IP (VIP) address corresponding to the first access request, wherein the first load balancing device pool is a main load balancing device pool corresponding to the first VIP address.

In some embodiments, further, whether the first load balancing device pool is available can be determined according to a working state (for example, traffic and load) of the first load balancing device pool. Specifically, whether the first load balancing device pool is insufficient in bandwidth or too high in load can be determined according to comparison of used traffic of the first load balancing device pool with a bandwidth threshold, or according to comparison of the quantity of available devices and the quantity of total devices of the first load balancing device pool with a preset ratio threshold, so whether the first load balancing device pool is available is further determined.

Step S702, in response to determining that the first load balancing device pool is available, forwarding the first access request to at least one first switch, wherein the at least one first switch is respectively coupled with each load balancing device in the first load balancing device pool via a routing protocol link.

According to some embodiments, in response to determining that the first load balancing device pool is unavailable, the first access request is forwarded to at least one second switch, wherein the at least one second switch is respectively coupled with each load balancing device in a second load balancing device pool via a routing protocol link, and wherein the second load balancing device pool is a standby load balancing device pool corresponding to the first VIP address.

According to some embodiments, in response to receiving a second access request from the client, whether the second load balancing device pool is available is determined according to a second VIP address corresponding to the second access request and different from the first VIP address, wherein the second load balancing device pool is a main load balancing device pool corresponding to the second VIP address; and in response to determining that the second load balancing device pool is available, the second access request is forwarded to the at least one second switch.

According to some embodiments, in response to determining that the second load balancing device pool is unavailable, the second access request is forwarded to the at least one first switch, wherein the first load balancing device pool is a standby load balancing device pool corresponding to the second VIP address, so as to achieve a disaster tolerant solution that is mutually main and standby.

In some embodiments, the load balancing devices in the load balancing device pools forward the access requests to back-end servers. Each load balancing device in the first load balancing device pool is respectively communicatively coupled with each of one or more back-end servers; and each load balancing device in the second load balancing device pool is also respectively communicatively coupled with each of the one or more back-end servers, and the different load balancing device pools are connected with the same back-end servers, so as to improve the utilization efficiency of the back-end servers.

The above embodiments of the present application provides the load balancing method designed to be mutually main and standby, which can receive the access requests from tenants and determine whether the main load balancing device pool is available. When the main load balancing device pool is unavailable, an access is forwarded to the standby load balancing device pool to implement a disaster tolerant solution that is mutually main and standby. When some load balancing device pools fail, work tasks may be migrated to their standby load balancing device pools, so as to achieve rapid escape from the failure.

Figure 8:
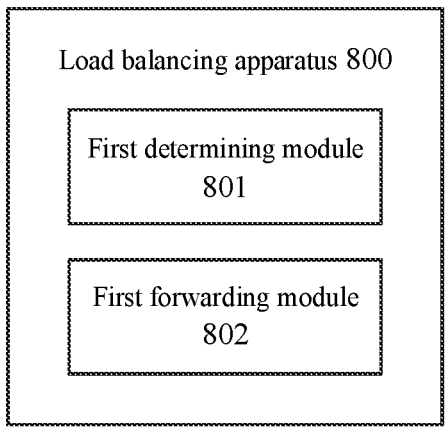
FIG. 8 shows a structural schematic diagram of a load balancing apparatus according to some embodiments of the present disclosure.

FIG. 8 shows a structural schematic diagram of a load balancing apparatus according to some embodiments of the present disclosure. As an implementation of the methods shown in the above figures, the present application further provides some embodiments of the load balancing apparatus, and the embodiments of the apparatus may be specifically applied in various electronic devices. As shown in FIG. 8, a main and standby disaster tolerant load balancing apparatus 800 of the present embodiments includes: a first determining module 801, used for determining whether a first load balancing device pool is available according to a first VIP address corresponding to a first access request in response to receiving the first access request from a client, wherein the first load balancing device pool is a main load balancing device pool corresponding to the first VIP address; and a first forwarding module 802, used for forwarding the first access request to at least one first switch in response to determining that the first load balancing device pool is available, wherein the at least one first switch is respectively coupled with each load balancing device in the first load balancing device pool via a routing protocol link.

Operations of the first determining module 801 and the first forwarding module 802 of the main and standby disaster tolerant load balancing apparatus 800 are similar to operations of step S701 and step S702 described previously, and will not be repeated here.

In some embodiments, the first forwarding module 802 may be configured to forward the first access request to a main switch in the at least one first switch when it is detected that the main switch in the at least one first switch is available through a keep-alive mechanism.

In some embodiments, the first forwarding module 802 may be configured to forward the first access request to a standby switch in the at least one first switch when it is detected that the main switch in the at least one first switch is unavailable but the standby switch is available through the keep-alive mechanism.

According to some embodiments, the load balancing apparatus 800 further includes: a second forwarding module, used for forwarding the first access request to at least one second switch in response to determining that the first load balancing device pool is unavailable, wherein the at least one second switch is respectively coupled with each load balancing device in a second load balancing device pool via a routing protocol link, and wherein the second load balancing device pool is a standby load balancing device pool corresponding to the first VIP address.

In some embodiments, the second forwarding module may be configured to forward the first access request to a main switch in the at least one second switch when it is detected that the main switch in the at least one second switch is available through the keep-alive mechanism.

In some embodiments, the second forwarding module may be configured to forward the first access request to a standby switch in the at least one second switch when it is detected that the main switch in the at least one second switch is unavailable but the standby switch is available through the keep-alive mechanism.

According to some embodiments, the load balancing apparatus 800 further includes: a second determining module, used for determining whether the second load balancing device pool is available according to a second VIP address corresponding to a second access request and different from the first VIP address in response to receiving the second access request from the client, wherein the second load balancing device pool is a main load balancing device pool corresponding to the second VIP address; and a third forwarding module, used for forwarding the second access request to the at least one second switch in response to determining that the second load balancing device pool is available.

According to some embodiments, the load balancing apparatus further includes: a fourth forwarding module, used for forwarding the second access request to the at least one first switch in response to determining that the second load balancing device pool is unavailable, wherein the first load balancing device pool is a standby load balancing device pool corresponding to the second VIP address.

Similarly, the third forwarding module and the fourth forwarding module may forward the second access request to the main switch or the standby switch in the at least one first switch or the at least one second switch through the same keep-alive mechanism as the first forwarding module and the second forwarding module.

In some embodiments, there may be one or more main switches and one or more standby switches in the at least one first switch and the at least one second switch.

In some embodiments, the main switch in the at least one first switch or the at least one second switch can be determined by a rotating manner.

According to some embodiments of the present disclosure, an electronic device is further provided, and the electronic device, for example, may be implemented as a routing apparatus.

According to embodiments of the present disclosure, a readable storage medium and a computer program product are further provided.

Figure 9:
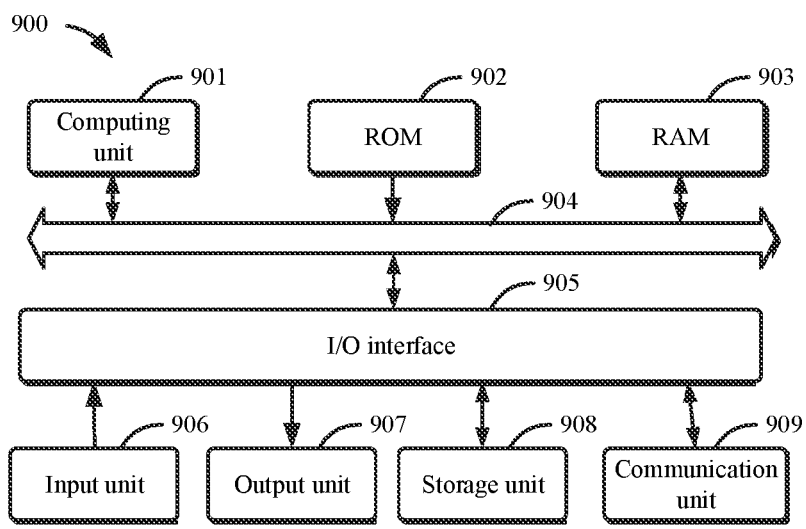
FIG. 9 shows a structural block diagram of an exemplary electronic device that can be used to implement the embodiments of the present disclosure.

Referring to FIG. 9, a structural block diagram of an electronic device 900 that may be used as a server or a client of the present disclosure will now be described, which is an example of a hardware device that may be applied to various aspects of the present disclosure. The electronic device aims to represent various forms of digital electronic computer devices, such as laptops, desktops, workbenches, personal digital assistants, servers, blade servers, large computers and other suitable computers. The electronic device may further represent various forms of mobile apparatuses, such as personal digital assistants, cellular phones, smart phones, wearable devices and other similar computing apparatuses. All the parts shown herein, connections and relations thereof, and functions thereof are examples only, and are not intended to limit the implementation of the present disclosure described and/or required herein.

As shown in FIG. 9, the device 900 includes a computing unit 901, capable of executing various suitable actions and processing according to a computer program stored in a read-only memory (ROM) 902 or a computing program loaded from a storage unit 908 into a random access memory (RAM) 903. The RAM 903 may further store various programs and data required for operation of the device 900. The computing unit 901, the ROM 902 and the RAM 903 are connected to one another through a bus 904. An input/output (I/O) interface 905 is also connected to the bus 904.

A plurality of parts in the device 900 are connected to the I/O interface 905, and include: an input unit 906, an output unit 907, a storage unit 908 and a communication unit 909. The input unit 906 may be any type of devices that can input information to the device 900. The input unit 906 can receive input numeric or character information, generate key signal inputs related to user settings and/or function control of the electronic device, and may include, but not limited to, a mouse, a keyboard, a touch screen, a trackpad, a trackball, an operation rod, a microphone and/or a remote controller. The output unit 907 may be any type of devices capable of presenting information, and may include, but not limited to, a display, a speaker, a video/audio output terminal, a vibrator, and/or a printer. The storage unit 908 may include, but not limited to, a magnetic disk and an optical disk. The communication unit 909 allows the device 900 to exchange information/data with other devices through a computer network such as the Internet and/or various telecommunication networks, and may include, but not limited to, a modem, a network card, an infrared communication device, a wireless communication transceiver, and/or a chipset, such as Bluetooth™ devices, 802.11 devices, WiFi devices, WiMax devices, cellular communication devices and/or analogues.

The computing unit 901 may be various universal and/or special processing assemblies with processing and computing capacity. Some examples of the computing unit 901 include, but not limited to a central processing unit (CPU), a graphics processing unit (GPU), various special artificial intelligence (AI) computing chips, various computing units for running a machine learning model algorithm, a digital signal processor (DSP), and any suitable processor, controller, micro-controller, etc. The computing unit 901 executes all methods and processing described above, for example a load balancing method. For instance, in some embodiments, the load balancing method may be implemented as a computer software program, which is tangibly contained in a machine readable medium, such as the storage unit 908. In some embodiments, the computer program may be partly or overall loaded and/or installed on the device 900 via the ROM 902 and/or the communication unit 909. When the computer program is loaded to the RAM 903 and executed by the computing unit 901, one or more steps of the load balancing method described above can be executed. Alternatively, in other embodiments, the computing unit 901 may be configured to execute the load balancing method through any other suitable means (e.g., by means of firmware).

Various implementations of systems and technologies as described above in this text may be implemented in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. These various implementations may be implemented in one or more computer programs. The one or more computer programs may be executed and/or interpreted on a programmable system including at least one programmable processor. The programmable processors may be special or universal programmable processors, can receive data and instructions from a storage system, at least one input apparatus and at least one output apparatus, and transmit the data and instructions to the storage system, the at least one input apparatus and the at least one output apparatus.

Program codes for implementing the method of the present disclosure may be written by any combinations of one or more programming languages. These program codes may be provided for processors or controllers of universal computers, special computers or other programmable data processing apparatuses, so functions/operations specified in flow diagrams and/or block diagrams are implemented when the program codes are executed by the processors or controllers. The program codes may be executed on a machine completely or partly, may be executed on a machine partly as a stand-alone software package, and may be executed on a remote machine partly or executed on a remote machine or a server completely.

In the context of the present disclosure, the machine readable medium may be a tangible medium, and may contain or store programs for an instruction executing system, apparatus or device to use or programs for the instruction executing system, apparatus or device to use conjunctively. The machine readable medium may be a machine readable signal medium or a machine readable storage medium. The machine readable medium may include, but not limited to electronic, magnetic, optical, electromagnetic, infrared or semi-conductor systems, apparatuses or devices, or any suitable combinations thereof. The more specific examples of the machine readable storage medium may include electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combinations thereof.

In order to provide interactions with users, the systems and technologies described herein can be implemented on a computer, which includes: a display apparatus (e.g., a cathode ray tube (CRT) or a liquid crystal display (LCD) monitor), used for displaying information to the users; and a keyboard and pointing apparatus (e.g., a mouse or a trackball), allowing the users to provide input for the computer through the keyboard and pointing apparatus. Other types of apparatuses may further be used for providing interactions with the users, for example, feedbacks provided for the users may be any form of sensor feedbacks (such as visual feedback, auditory feedback, or tactile feedback); and input from the users may be received in any form (including vocal input, voice input, or tactile input).

The systems and technologies described herein may be implemented in a computing system (e.g., serving as a data server) with a background part, or a computing system (e.g., an application server) with a middleware part, or a computing system (e.g., a user computer with a graphic user interface or a network browser through which the users can interact with the implementations of the systems and technologies described herein) with a front-end part, or a computing system including any combination of the background part, the middleware part and the front-end part. The parts of the systems can be connected to one another through any form or medium of digital data communication (e.g., communication networks). Examples of the communication networks include: a local area network (LAN), a wide area network (WAN) and the Internet.

The computer systems may include a client and a server. The client and the server generally are away from each other and usually interact with each other through the communication networks. A relationship of the client and the server is generated through a computer program that runs on a corresponding computer and has a client-server relation with the computer.

It should be understood that rearrangement, addition or deletion of steps can be performed by using various forms of flows described above. For example, all the steps recorded in the present disclosure may be executed in parallel, may also be executed in sequence or in different sequences without limitations herein as long as expected results of the technical solution of the present disclosure can be implemented.

Although the embodiments or examples of the present disclosure have been described with reference to the drawings, it should be understood that the above methods, systems and devices are merely exemplary embodiments or examples, and the scope of the present disclosure is not limited by these embodiments or examples, but only limited by the authorized claims and their equivalent scope. Various elements in the embodiments or examples may be omitted or may be replaced by their equivalent elements. In addition, all the steps may be performed in an order different from that described in the present disclosure. Further, various elements in the embodiments or examples may be combined in various ways. What is important is that as technology evolves, many elements described herein may be replaced by equivalent elements appearing after the present disclosure.

The invention claimed is:

1. A system, comprising:
    a first load balancing device cluster, wherein the first load balancing device cluster comprises a first load balancing device pool and a second load balancing device pool, the first load balancing device pool including at least two load balancing devices and the second load balancing device pool including at least two load balancing devices which are different than the at least two load balancing devices in the first load balancing device pool;
    at least one first switch, wherein the at least one first switch is respectively coupled with each load balancing device in the first load balancing device pool via a first routing protocol link; and
    at least one second switch, wherein the at least one second switch is respectively coupled with each load balancing device in the second load balancing device pool via a second routing protocol link, wherein:
    the at least one first switch and the at least one second switch are configured to be able to be connected with the Internet through a router;
    one of the first load balancing device pool and the second load balancing device pool is configured as a standby load balancing device pool of the other one;
    the first load balancing device pool and the second load balancing device pool are connected with a same back-end server;
    each load balancing device in the first load balancing device pool is configured to upwardly publish first routing information:
    each load balancing device in the second load balancing device pool is configured to upwardly publish second routing information different from the first routing information:
    the first routing information comprises first Virtual IP (VIP) address information corresponding to the first load balancing device pool as a main load balancing device pool and second Virtual IP (VIP) address information corresponding to the first load balancing device pool as the standby load balancing device pool of the second load balancing device pool;
    the second routing information comprises third Virtual IP (VIP) address information corresponding to the second load balancing device pool as a main load balancing device pool and fourth Virtual IP (VIP) address information corresponding to the second load balancing device pool as the standby load balancing device pool of the first load balancing device pool;
    the first VIP information corresponds to the fourth Virtual IP (VIP) address information, and the second VIP information corresponds to the third VIP information;
    a Prefix value comprised in the first VIP information is 25;
    a Prefix value comprised in the fourth VIP information is 24; and
    the first VIP information and the fourth VIP information comprise a same first VIP address.

2. The system according to claim 1, wherein each load balancing device in the first load balancing device pool is respectively communicatively coupled with each of one or more back-end servers; and
    each load balancing device in the second load balancing device pool is respectively communicatively coupled with each of the one or more back-end servers.

3. The system according to claim 1, wherein the first load balancing device pool and the second load balancing device pool are from a same available zone.

4. The system according to claim 1, wherein the first load balancing device pool and the second load balancing device pool are from different available zones.

5. The system according to claim 1, wherein a Prefix value comprised in the second VIP information is 24;
    a Prefix value comprised in the third VIP information is 25;
    the second VIP information and the third VIP information comprise a same second VIP address; and
    the second VIP address is different from the first VIP address.

6. The system according to claim 1, further comprising:
    at least one second load balancing device cluster, wherein the at least one second load balancing device cluster comprises a third load balancing device pool and a fourth load balancing device pool;
    at least one third switch, wherein the at least one third switch is respectively coupled with each load balancing device in the third load balancing device pool via a third routing protocol link;
    at least one fourth switch, wherein the at least one fourth switch is respectively coupled with each load balancing device in the fourth load balancing device pool via a fourth routing protocol link;
    the at least one third switch and the at least one fourth switch are configured to be able to be connected with the Internet; and one of the third load balancing device pool and the fourth load balancing device pool is configured as a standby load balancing device pool of the other one.

7. The system according to claim 1, wherein the routing protocol link use a Border Gateway Protocol (BGP) or an Open Shortest Path First (OSPF) protocol.

* * * * *